(No Model.)

W. L. PEELER.
INSECT TRAP STAND.

No. 533,017. Patented Jan. 22, 1895.

Witnesses
Geo. M. Anderson
Phill Mlasi.

Inventor
W. L. Peeler
by E. W. Anderson
his Attorney

UNITED STATES PATENT OFFICE.

WILLIAM L. PEELER, OF ORLANDO, FLORIDA.

INSECT-TRAP STAND.

SPECIFICATION forming part of Letters Patent No. 533,017, dated January 22, 1895.

Application filed August 31, 1894. Serial No. 521,829. (No model.)

*To all whom it may concern:*

Be it known that I, WILLIAM L. PEELER, a citizen of the United States, and a resident of Orlando, in the county of Orange and State of Florida, have invented certain new and useful Improvements in Insect-Trap Stands; and I declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
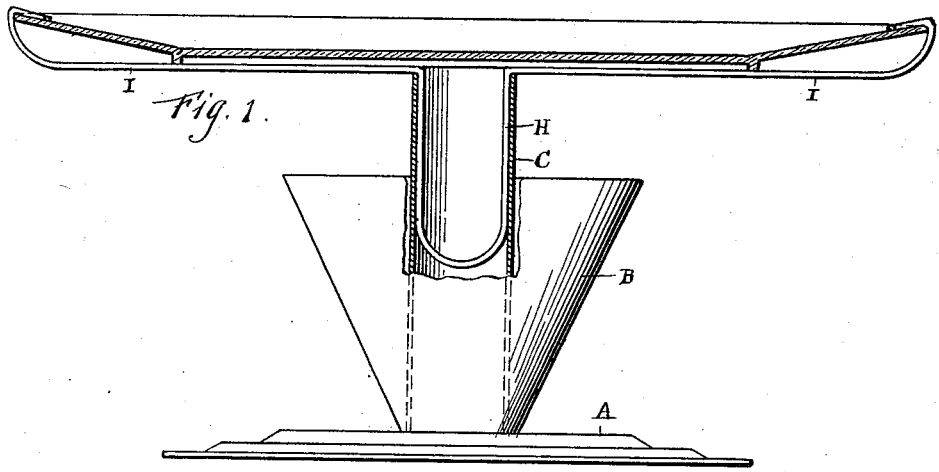
Figure 2:
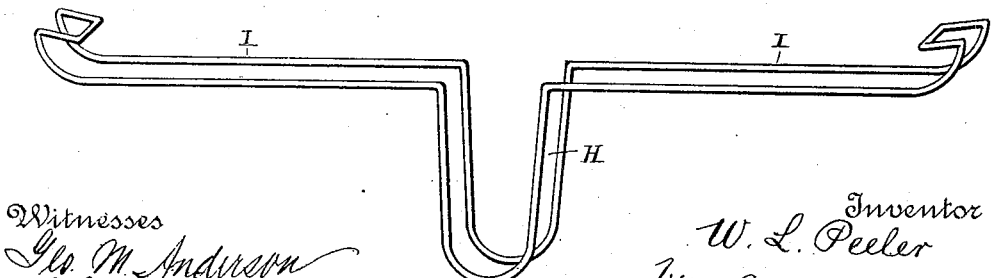

Figure 1 is an elevation of the invention, partly in section, with a plate thereon. Fig. 2 is a detail perspective view of the wire support.

The object of this invention is to provide a stand or support upon which food may be placed and kept in such a manner that it will be impossible for ants, roaches, or other creeping insects to gain access thereto, and the invention consists in the novel construction and combination of parts, all as hereinafter described and pointed out in the appended claim.

Referring to the accompanying drawings, the letter A designates a suitable base or foot upon which is supported an open water cup or receptacle B, of funnel form. The upper portion of said receptacle is formed with a surrounding, internal flange a, which is inclined inwardly and downwardly, and forms a guard against the escape of insects from the receptacle. Extending centrally down through the cup or receptacle, and secured to the base or foot, is a hollow tube or standard C, whose upper end projects above the top of said cup or receptacle. This tube forms the support for the plate shelf, or other receptacle upon which the food is placed. This support consists of a piece of heavy wire of one or more strands, bent centrally to form a depending loop H which is adapted to fit into the tube C, in the manner shown. Extending in opposite directions from the loop H are arms I, I, which are adapted to form a support for a plate, shelf, or other food receptacle.

The device may be made of tin, glass, porcelain, or any other suitable material.

The cup or receptacle being filled with water or other liquid, forms an effectual guard and trap for all insects which may endeavor to crawl up to the food, it being impossible for them to gain access thereto.

Having thus described my invention, what I claim as new, and desire to secure by Letters Patent, is—

The herein described insect proof support for plates and other receptacles, said support comprising a base, a flared water cup supported on said base, a hollow tubular standard rising centrally from the bottom of said cup, and a holder comprising a wire bent to form laterally extending arms, and a central loop arranged to fit within said standard, substantially as specified.

In testimony whereof I affix my signature in presence of two witnesses.

WILLIAM L. PEELER.

Witnesses:
W. F. BARNES,
ED. ROBERSON.